United States Patent [19]

Hashimoto et al.

[11] Patent Number: 5,561,185
[45] Date of Patent: Oct. 1, 1996

[54] FIRE-RETARDANT RESIN COMPOSITION AND A COVERED ELECTRIC WIRE

[75] Inventors: Dai Hashimoto, Ichihara; Masaki Nishiguchi, Chiba; Shinichi Irie, Tokyo; Yoshihiro Inuizawa, Chiba; Yasuhiro Kamei, Ichihara, all of Japan

[73] Assignees: The Furukawa Electric Co., Ltd., Tokyo; Ube Industries, Ltd., Yamaguchi-ken, both of Japan

[21] Appl. No.: 337,030

[22] Filed: Nov. 7, 1994

[30] Foreign Application Priority Data

Nov. 12, 1993 [JP] Japan ........................................ 307457
Nov. 12, 1993 [JP] Japan ........................................ 307458

[51] Int. Cl.$^6$ .............................. C08J 5/10; C08K 3/10; C08L 23/10
[52] U.S. Cl. ............... 524/436; 428/36.91; 428/461; 428/463; 524/425; 524/444; 524/445; 524/447; 524/451
[58] Field of Search .................... 524/436, 424, 524/425, 444, 445, 447, 451; 428/36.91, 461, 463

[56] References Cited

U.S. PATENT DOCUMENTS 4,687,804  8/1987  Shiraishi et al. ........................ 524/505
4,845,146  7/1989  Inoue et al. ............................. 524/436
4,859,366  8/1989  Djiauw et al. .......................... 524/436
5,317,051  5/1994  Harashige et al. ...................... 524/310

FOREIGN PATENT DOCUMENTS 62-131052  6/1987  Japan.

*Primary Examiner*—Paul R. Michl
*Assistant Examiner*—U. K. Rajguru
*Attorney, Agent, or Firm*—Birch, Stewart, Kolasch & Birch, LLP

[57] ABSTRACT

There is disclosed a fire-retardant resin composition, comprising a polypropylene-series resin (a), a modified polyethylene modified with an unsaturated carboxylic acid or its derivative (b), a metal hydrate (c), and an ethylene-series copolymer (d), in a specific ratio; and an electric wire with a cover layer formed on the circumference of a conductor, in which the cover layer is composed of a composition prepared by blending (c) a metal hydrate with, in a specific ratio, a resin mixture, containing (a) a polypropylene-series resin, (b) a modified polyethylene, and (d) an ethylene-series copolymer.

The fire-retardant resin composition is excellent in tensile strength, heat resistance, extrudability, and moldability. The covered electric wire is excellent in electric-wire properties and good in the end workability.

7 Claims, 2 Drawing Sheets

FIRE-RETARDANT RESIN COMPOSITION AND A COVERED ELECTRIC WIRE

FIELD OF THE INVENTION

The present invention relates to a fire-retardant resin composition that has proper mechanical properties, heat resistance, and flexibility; that is excellent in extrudability; and that is suitable to be extruded into tubes, pipes, and coverings.

Further, the present invention relates to a covered electric wire suitable as electric wire for automobiles and as internal wiring of electronic equipment, in which a conductor is covered with a layer of the above fire-retardant resin composition. More particularly, the present invention relates to a covered electric wire that has excellent fire retardancy, tensile properties, heat resistance, and abrasion resistance; that does not evolve large amounts of smoke or noxious corrosive-gases when burned; that is good in workability of the covering layer at the end of the covered wire in the step of removing the covering layer; and that is excellent in productivity by high-speed extrusion.

BACKGROUND OF THE INVENTION

Conventionally, as fire-retardant resin compositions, PVC or a polyolefin composition blended with a halogen-type fire-retardant, is mainly used. However, such compositions have problems such as, when the compositions are burned, large amounts of smoke and corrosive-gases, such as hydrogen chloride, are produced.

Therefore, recently, as fire-retardant resin compositions that evolve no corrosive-gases and evolve less smoke when burned, non-halogen-type fire-retardant resin compositions highly loaded with a metal hydrate, typically magnesium hydroxide or the like, are under study and are used practically in some fields.

In such compositions, because it is required to fill a base polymer with a high content of metal hydrate, as the base polymer, an ethylene/vinyl acetate copolymer or an ethylene/acrylate copolymer, with which the filler, such as magnesium hydroxide, can be easily blended, is mainly used. However, since the tensile strength of such compositions is on the order of about 10 MPa, and the melting point thereof is about 100° C., the level of the properties is still low in comparison with the level of the properties (the tensile strength, about 15 to 20 MPa; and the ratio of heat deformation at 120° C., about 10%) of the PVC currently mainly used to be extruded. Therefore, the development of non-halogen-type fire-retardant resin compositions having properties similar to those of the current PVC is desired.

On the other hand, electric wire used for automobiles, and electric wire used as internal wiring of electronic equipment, as standardized by JASO D611 and JIS C 3406, are required to have such various properties as fire retardancy, tensile properties, heat resistance, and abrasion resistance. Accordingly, as the covering material of these electric wires, PVC or polyolefin compounds blended with a halogen-type fire-retardant is mainly used.

However, since such electric wires have the problem stated in the above that, when they are burned, large amounts of smoke and corrosive-gases are produced, electric wires that evolve less smoke and no corrosive-gases when burned have recently been under study.

As a covering material of these electric wires, an ethylene-series copolymer (e.g., an ethylene/vinyl acetate copolymer and an ethylene/acrylate copolymer) loaded highly with a metal hydrate, has been studied. However the electric wire covered with that material is not satisfactory when used as electric wire for automobiles or as internal wiring of electronic equipment, in view of the heat resistance and mechanical properties, such as tensile strength and abrasion resistance.

Incidentally, although an example of an electric wire covered with a polypropylene composition excellent in mechanical properties and heat resistance is disclosed in Japanese Patent Application (OPI) No. 131052/1987, if an electric wire covered with this composition is used as electric wire for automobiles, as shown in the Example, it has the problem that the rupture stress is about 2 to 10 MPa, showing that the tensile strength is insufficient. Further, the rate of extrusion of the electric wire is only about 10 to 80 m/min, which is extremely low in practice in comparison with the rate of extrusion of an electric wire of 400 to 500 m/min, which is usually required industrially, and there is also the problem that the electric wire becomes expensive.

When the circumference of a conductor is covered with a layer of a composition highly filled with a metal hydrate, in the step of removing the covering layer at the end of the electric wire by a wire stripper or a casting machine, a residue of the covering layer remains, leading to the problem that a contact failure with the terminal onto which the electric wire is to be mounted occurs.

SUMMARY OF THE INVENTION

First object of the present invention is to provide a non-halogen-type fire-retardant resin composition that is excellent in mechanical strength, extension, and heat resistance; that is inexpensive; and that has the same productivity (moldability) as that of PVC or the like that is currently used.

Second object of the present invention is to provide an electric wire that has the fire retardancy, the tensile properties, the heat resistance, and the abrasion resistance that are required for electric wire for automobiles and for internal wiring of electronic equipment; that does not evolve large amounts of smoke or noxious corrosive-gases when burned; that is good in workability of the covering layer at the end of the covered wire in the step of removing the covering layer; and that can be produced at a high speed by covering the circumference of a conductor, which is an important factor to produce an inexpensive electric wire.

These and other objects, advantages, features, and uses will become more apparent as the description proceeds, when considered with the accompanying drawings.

Figure 1:
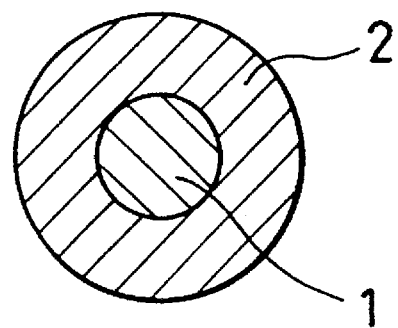
FIG. 1 is a cross-sectional view of a first example of an electric wire of the present invention, in which a covering layer is formed as an insulating layer on the circumference of a conductor.

DETAILED DESCRIPTION OF THE INVENTION (1) The above first object can be attained by:
 1) A fire-retardant resin composition, comprising
  (a) 20 to 60% by weight of a polypropylene-series resin,
  (b) 1 to 20% by weight of a polyethylene modified with an unsaturated carboxylic acid or its derivative,
  (c) 35 to 65% by weight of a metal hydrate, and
  (d) an ethylene-series copolymer in such a weight ratio that $0.48 > (d)/\{(a)+(b)+(d)\}$,
 2) The fire-retardant resin composition as stated in the above 1), further comprising (e), an aromatic vinyl/diene block copolymer, in such a weight ratio that $0.2 \geq (e)/\{(a)+(b)+(d)+(e)\}$ (hereinafter the fire-retardant resin compositions stated in the above 1) and 2) are referred to as first invention of the present invention).

In the first invention, the addition of the ethylene-series copolymer (d) can further enhance fire retardancy. Further, the addition of the aromatic vinyl/diene block copolymer (e) can improve the compatibility between the ethylene/propylene random copolymer and the modified polyethylene, and it also can improve the mechanical strength and the hand and feel of the composition.

(2) The above second object can be attained by:
 1) An electric wire with a cover layer formed on the circumference of a conductor, in which the cover layer is composed of a composition prepared by blending 100 parts by weight of a resin mixture with 50 to 180 parts by weight of (c) a metal hydrate; the said resin mixture contains, as resin components, (a) a polypropylene-series resin in an amount of 40% by weight or more, (b) a modified polyethylene in an amount of 1.5 to 30% by weight, which polyethylene is modified with an unsaturated carboxylic acid or its derivative, and (d) an ethylene-series copolymer in an amount of less than 48% by weight,
 2) The covered electric wire as stated in the above 1), wherein said resin mixture contains further (e), an aromatic vinyl/diene block copolymer in an amount of 20% by weight or less (hereinafter the electric wires stated in the above 1) and 2) are referred to as second invention of the present invention).

In this specification, "the present invention" denotes both the above first and second inventions, unless otherwise specified.

First, each component of the fire-retardant resin composition of the first invention, and each component used in the composition to form a cover of the covered electric wire of the second invention, is described in detail.

(a) Polypropylene-series resins

As the polypropylene-series resin in the present invention, one resin containing ethylene/propylene random copolymers in an amount of 50% by weight or more is used preferably. As the other polypropylene-series resins to be mixed with the above ethylene/propylene random copolymer, one or more resins are blended that are chosen from ethylene/propylene block copolymers, propylene homopolymers, propylene/1-butene random copolymers, propylene/1-butene block copolymers, propylene/4-methylpentene-1 random copolymers, propylene/4-methylpentene-1 block copolymers, propylene/1-hexene random copolymers, and propylene/1-hexene block copolymers. Particularly those whose ethylene/propylene random copolymer amounts to 60% by weight or more, preferably 70% by weight or more, and more preferably 80% by weight or more, are used. The polypropylene-series resin for use in the present invention comprises an ethylene/propylene random copolymer.

The ethylene/propylene random copolymer used herein is one in which ethylene and propylene are polymerized substantially randomly, and preferably the ethylene content is 0.5 to 6% by weight, and more preferably 1 to 5% by weight. In the random copolymer of the present invention, ethylene and propylene are bonded substantially randomly, and the random copolymer is different from a block copolymer, and has almost no domain structure.

A random copolymer whose ethylene content is too small is unpreferable, because the filler acceptability is poor and the tensile strength and the extension are lowered greatly when a metal hydrate or the like is mixed. On the other hand, a random copolymer whose ethylene content is too large is unpreferable, because the heat resistance is poor.

Further, when a composition is used as a covering of an electric wire, the ratio of the ethylene/propylene random copolymer in the polypropylene-series resin can be set at 50% by weight or more. The electric wire whose circumference is covered with such a composition, is so high in tensile strength and extension and excellent in flexibility, that the wiring in automobiles and electronic equipment can be carried out more flexibly.

The melt flow rate (MFR) of the polypropylene-series resin is preferably in the range of 0.1 to 20 g/10 min, more preferably 0.1 to 10 g/10 min (measured by using a load of 2.16 kgf at 230° C.).

The melt flow rate (MFR) of the ethylene/propylene random copolymer is preferably in the range of 0.5 to 10 g/10 min (measured by using a load of 2.16 kgf at 230° C.).

(b) Modified polyethylenes

The modified polyethylene in the present invention is obtained by modifying a polyethylene with an unsaturated carboxylic acid and/or its derivative (hereinafter referred to as an unsaturated carboxylic acid or the like).

To modify a polyethylene with an unsaturated carboxylic acid or the like, for example, the polyethylene and the unsaturated carboxylic acid or the like are melted and kneaded in the presence of a peroxide at a temperature that is equal to or over the 1-min half-life period temperature of that peroxide. Also that polyethylene may be interacted with that unsaturated carboxylic acid or the like in the presence of an inert solvent, such as hexane, heptane, benzene, and toluene. Preferably the ratios of the unsaturated carboxylic acid or the like and the peroxide to be mixed with the polyethylene are respectively from 0.01 to 1.0 parts by weight, and from 0.01 to 0.5 parts by weight, to 100 parts by weight of the polyethylene.

As the polyethylene, for example, a very-low-density polyethylene (VLDPE), a linear-low-density polyethylene (LLDPE), a low-density polyethylene (LDPE), a medium-density polyethylene (MDPE), and/or a high-density polyethylene (HDPE) can be used. The MFR is preferably in the range of 0.5 to 10 g/min (measured by using a load of 2.16 kfg at 190° C.).

As the unsaturated carboxylic acid, for example, maleic acid, itaconic acid, or fumaric acid can be used. As the unsaturated carboxylic acid derivative, for example, a maleic acid monoester, a maleic acid diester, maleic anhydride, an itaconic acid monoester, an itaconic acid diester, itaconic anhydride, a fumaric acid monoester, and a fumaric acid diester can be mentioned.

As the modified polyethylene, a polyethylene modified with maleic anhydride is preferable.

(c) Metal hydrate

As the metal hydrate, inorganic compounds having hydroxyl groups or water of crystallization, such as aluminum hydroxide, magnesium hydroxide, basic magnesium carbonate, hydrated aluminum silicate, aluminum orthosilicate, hydrated magnesium silicate, and hydrotalcite, can be mentioned. These metal hydrates may be used singly or as a combination of two or more, and magnesium hydroxide is used most preferably. Preferably the metal hydrates have a crystal-particle diameter in the range of 0.3 to 1.0µ and are almost free of aggregation. Examples of such metal hydrates are magnesium hydroxide-type fire retardants, for example, KISUMA 5 (registered trademark), manufactured by Kyowa Kagaku Kogyo KK. Among them, those whose surface has been treated, such as KISUMA 5A, 5B, 5E, and 5J, are preferred.

(d) Ethylene-series copolymers

As the ethylene-series copolymer, ethylene-series copolymers, such as an ethylene/vinyl acetate copolymer, an ethylene/acrylate copolymer, an ethylene/methacrylate copolymer, an ethylene/acrylic acid copolymer, an ethylene/methacrylic acid copolymer, and an ethylene/propylene rubber, can be mentioned. Out of these ethylene-series copolymers, ethylene/vinyl acetate copolymer and ethylene/acrylate copolymer, such as ethylene/ethyl acrylate copolymer, or a mixture of these, are preferable, and ethylene/vinyl acetate copolymer is most preferable.

In the ethylene-series copolymers, particularly preferably the comonomer amounts to 8 to 30% by weight. The MFR is preferably in the range of 0.01 to 10 g/10 min (measured by using a load of 2.16 kgf at 190° C.).

(e) Aromatic vinyl/diene block copolymers

To the fire-retardant resin composition of the first invention, and to the composition that is used for a covered electric wire of the second invention, an aromatic vinyl/diene block copolymer can be further added.

The aromatic vinyl/diene block copolymer is a block copolymer consisting of one or more blocks A, which blocks A are substantially made up of polymers of an aromatic vinyl compound, such as styrene; and one or more of blocks B, which blocks B are substantially made up of polymers of a diene compound, such as butadiene. Preferably the block A is a block, for example, of a polystyrene, a poly-o-methylstyrene, a poly-m-methylstyrene, a poly-p-methylstyrene, a poly-α-methylstyrene, a poly-β-methylstyrene, a polydimethylstyrene, or a polytrimethylstyrene. Preferably the block B is a block, for example, of a polybutadiene, a polyisoprene, or a butadiene/isoprene copolymer.

As examples of the block copolymer used in the present invention, a polystyrene/polybutadiene/polystyrene block copolymer, a polystyrene/polyisoprene/polystyrene block copolymer, a poly-α-methylstyrene/polybutadiene/ poly-α-methylstyrene block copolymer, a poly-α-methylstyrene/polyisoprene/poly-α-methylstyrene block copolymer, a poly-β-methylstyrene/polybutadiene/poly-β-methystylene block copolymer, and a poly-β-methylstyrene/polyisoprene/poly-β-methylstyrene block copolymer, or products obtained by hydrogenating these block copolymers can be mentioned. In the present invention, a block copolymer whose block A is hydrogenated little and whose block B is selectively hydrogenated is particularly preferable. For example, a styrene/hydrogenated butadiene/styrene block copolymer (=styrene/ethylene/butylene/styrene copolymer= SEBS) can be mentioned. The above block copolymers may be used as a mixture of two or more.

The ratios of the polypropylene-series resin (a), the modified polyethylene (b), the metal hydrate (c), the ethylene-series copolymer (d), and the aromatic vinyl/diene block copolymer (e) of the fire-retardant resin composition of the present invention are now described.

The ratio of the polypropylene-series resin (a) is 20 to 60% by weight, preferably 20 to 55% by weight, and most preferably 25 to 50% by weight, in the composition. If the ratio of the polypropylene-series resin is too large, the fire-retardancy of the composition is lowered. Preferably the ratio of the ethylene/propylene random copolymer in the polypropylene-series resin is 60% by weight or more. If the ratio of the ethylene/propylene random copolymer in the polypropylene-series resin is too small, the tensile strength and the extension of the composition are sometimes lowered greatly.

The ratio of the modified polyethylene (b) is 1 to 20% by weight, and preferably 2 to 15% by weight. If the ratio of the modified polyethylene is too small, only a composition poor in tensile strength and low-temperature properties is obtained. On the other hand, if the ratio of the modified polyethylene is too large, the composition is poor in fluidity and is difficult to be extruded, which is unpreferable.

The ratio of the metal hydrate (c) is in the range of 35 to 65% by weight, and preferably in the range of 40 to 60% by weight. If the ratio of the metal hydrate is too small, satisfactory fire retardancy cannot be obtained. On the other hand, if the ratio is too large, a composition excellent in tensile strength, extension, and moldability cannot be obtained.

By the addition of the ethylene-series copolymer (d) to the composition, the fire retardancy is further improved. However, the amount of the ethylene-series copolymer must be less than 48% by weight to the total amount of the resin components in the fire-retardant resin composition of the first invention; namely, to 100 parts by weight of the total of the polypropylene-series resin (a), the modified polyethylene (b), and the ethylene-series copolymer (d). If the ratio is 48% by weight or more, a composition excellent in tensile strength and heat resistance cannot be obtained, which is unpreferable. In order to improve the fire-retardancy, the amount of the ethylene-series copolymer is preferably in the range of 10% by weight or more and less than 48% by weight to the total amount of the resin components in the composition.

To the fire-retardant resin composition of the first invention, further the aromatic vinyl/diene block copolymer (e) may be added in order to improve, for example, the mechanical strength and the hand and feel, and the amount to be added is preferably 20% by weight or less and more preferably 5 to 15% by weight in all the resin components ((a)+(b)+(d)+(e)) of the composition. If the amount of the aromatic vinyl/diene block copolymer to be blended is too large in the total of the resin components, the moldability is conspicuously lowered.

Although the fire-retardant resin composition of the first invention is used to cover an electric wire, as a covering of an electric wire, the composition that is used in the second invention is particularly preferably used.

The ratios of the polypropylene-series resin (a), the modified polyethylene (b), the metal hydrate (c), the ethylene-series copolymer (d), and the aromatic vinyl/diene block copolymer (e) of the resin composition that is used for a electric wire with a cover layer of the second invention are now described.

The ratio of the above polypropylene-series resin (a) in the composition is preferably 40% by weight or more in the total amount of the resin components, i.e., the total of the resin mixture consisting of the polypropylene-series resin (a), the modified polyethylene (b), and the ethylene-series copolymer (d), or the total combination of these resin components and the aromatic vinyl/diene block copolymer (e). If the ratio is 40% by weight or more, since the deformation of the electric wire covered with the composition by heating is low and the mechanical properties, such as abrasion resistance and tensile properties, are excellent, the electric wire is suitable as electric wire for automobiles and as internal wiring material of electronic equipment.

The amount of the modified polyethylene (b) to be blended is in the range of 1.5 to 30% by weight, preferably 5 to 20% by weight in the resin mixture (composition). If the amount of the modified polyethylene to be blended in the resin mixture is too small, the abrasion resistance and the tensile properties of the electric wire are not satisfactory, while if the amount of the modified polyethylene to be blended is too large, the fluidity of the composition is lowered, and therefore an electric wire cannot be covered at a high extrusion-speed.

The amount of the metal hydrate (c) to be blended in a composition for a covering of an electric wire is in the range of 50 to 180 parts by weight, and preferably 65 to 150 parts by weight, to 100 parts by weight of the resin mixture. (Calculated in terms of the ratio to the total of the composition, the ratio of the metal hydrate (C) is in the range of 33.3 to 64.3% by weight, preferably 39.4 to 60.0% by weight.) If the amount of the metal hydrate to be blended is too small, satisfactory fire-retardancy cannot be obtained for electric wire for automobiles and for internal wiring of electronic equipment. On the other hand, if the amount is too large, the tensile strength and the extension of the electric wire are lowered conspicuously, and the extrudability for the production of electric wire is lowered conspicuously, which is not preferable.

When the ethylene-series copolymer (d), such as ethylene/vinyl acetate copolymer, is blended in a covering layer for an electric wire, the fire retardancy of the electric wire is improved. The ratio of the ethylene-series copolymer must be less than 48% by weight of the total amount of the resin components (resin mixture) in the covering composition. If the ratio is 48% by weight or more, it is unpreferable because the heat resistance, the tensile properties, and the end workability of the covered electric wire are lowered. In order to improve the fire-retardancy, the amount of the ethylene-series copolymer is preferably in the range of 10% by weight or more and less than 48% by weight to the total amount of the resin components in the composition.

Further, blending the aromatic vinyl/diene block copolymer (e) can improve, for example, the tensile strength and the extension of the covered electric wire, and the amount thereof to be blended is preferably 20% by weight or less and more preferably 5 to 15% by weight of the total amount of the resin components (resin mixture) in the covering composition. If the amount of the aromatic vinyl/diene block copolymer to be blended is too large in relation to the total of the resin components, the molding speed is lowered, resulting in that desirable industrial productivity-rate can not be obtained.

To enhance the fire retardancy further, for example, carbon black, red phosphorus, a tin compound, or fibrous magnesium hydroxide may be further added to the resin composition. Further, if necessary, for example, an antioxidant, a copper-damage-prevention agent, an ultraviolet absorber, a dispersant, or a pigment may be added.

The fire-retardant resin composition of the first invention can be obtained by melting and kneading the above components. To melt and knead the components, a known apparatus, such as a double-screw mixing extruder, a Banbury mixer, and a pressure kneader, can be used. The components (a) to (d), or (a) to (e) may be kneaded in any order. These components may be melted and kneaded after being dry-blended at room temperature.

At the time of melting and kneading, a peroxide may be mixed with the fire-retardant resin composition of the first invention, and the composition may be heated to a temperature equal to or higher than the decomposition temperature of the peroxide, to cause crosslinking to take place. Also, the fire-retardant resin composition of the first invention may be irradiated with a radiant ray, to cause crosslinking to take place in the resin composition.

The covered electric wire of the second invention is produced by covering the circumference of a conductor with the above resin composition as a covering layer, by extruding the composition using a usual extruder for the production of electric wires. At that time, preferably the temperatures of the extruder are such that the temperature in the cylinder is about 190° C. and the temperature at the crosshead section is about 200° C.

Figure 2:
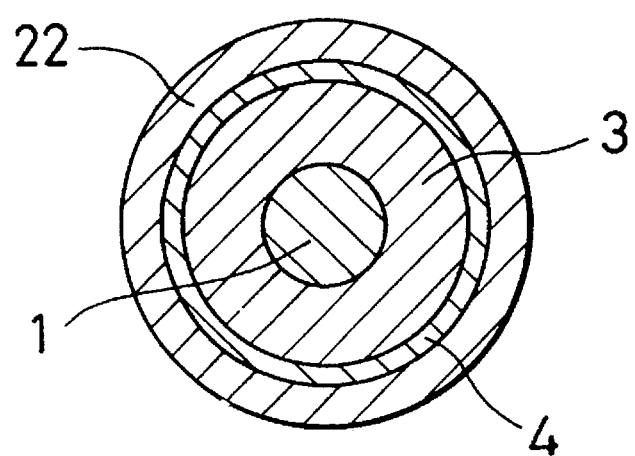
FIG. 2 is a cross-sectional view of a second example of an electric wire of the present invention, in which the circumference of a conductor is provided with an insulating layer and a screening layer, on whose circumference is provided a covering layer as a protective layer.
Figure 3A:
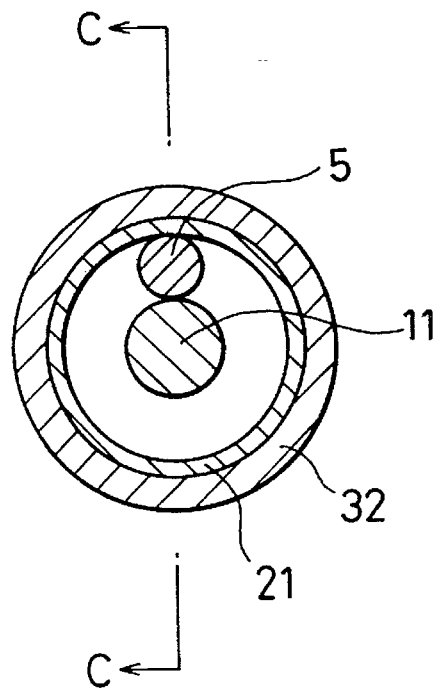
FIG. 3A is a cross-sectional view of a third example of an electric wire of the present invention, which is a coaxial cable wherein a CORDEL insulation is wound around the circumference of an inner conductor, an outer conductor is provided on the CORDEL insulation, and a covering layer is provided as an insulating protective layer on the circumference of the outer conductor.
Figure 3B:
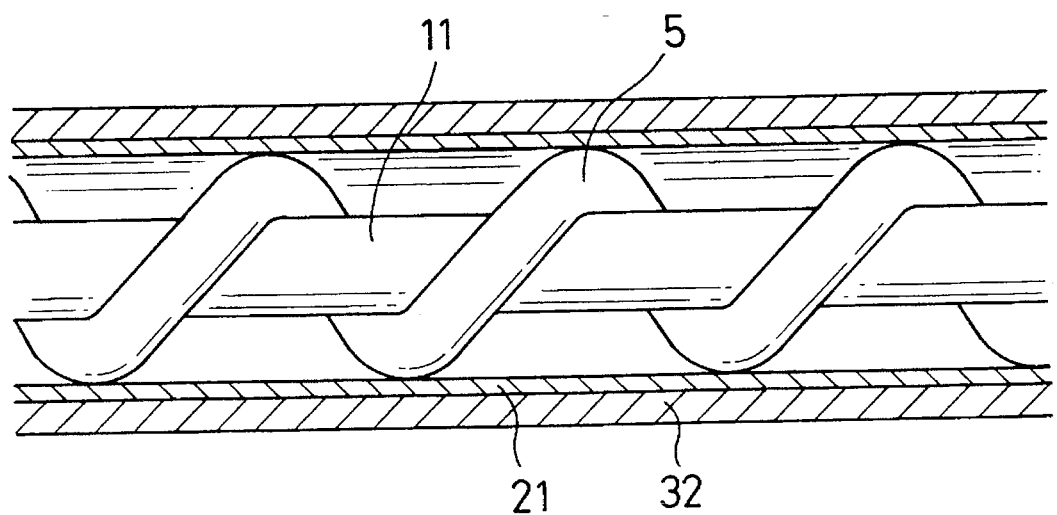
FIG. 3B is a front view of the coaxial cable of FIG. 3A, taken along line C—C of FIG. 3A, with part of only the outer conductor and the covering layer broken away.

The covered electric wire of the second invention includes all of electric wires in which the circumference of a conductor is covered with the above resin composition as a covering layer, and the structure or form of the electric wire is not particularly restricted. The thickness of the covering layer and the thickness of the conductor are not particularly different from those of conventional electric wires. They are varied depending on, for example, the type of electric wire and the application thereof and can be determined suitably. FIGS. 1 to 3B illustrate examples of the structure of the covered electric wires of the second invention. FIG. 1 is a first example of an electric wire of the second invention, in which a covering layer 2 is formed as an insulating layer on the circumference of a conductor 1, made up of a solid wire or a stranded conductor. FIG. 2 is a second example of an electric wire of the second invention, in which the circumference of a conductor 1 is provided with an insulating layer 3, and then with a screening layer 4, on whose circumference is provided a covering layer 22, as a protective layer (sheath). FIG. 3A is a cross-sectional view of a third example of an electric wire of the second invention, showing a coaxial cable wherein a CORDEL insulation 5 is wound around the circumference of an inner conductor 11, an outer conductor 21 is provided on the CORDEL insulation, and a covering layer 32 is provided as an insulating protective layer (sheath) on the circumference of the outer conductor; and FIG. 3B is a front view of the coaxial cable of FIG. 3A, taken along line C—C of FIG. 3A, with part of only the outer conductor 21 and the covering layer 32 broken away.

The fire-retardant resin composition of the first invention uses, as a base polymer, a blend of a polypropylene-series resin and a modified polyethylene, and the composition is excellent in tensile strength and heat resistance in comparison with the conventional non-halogen-type fire-retardant resin composition. Further, it is excellent in extrudability to be used in producing various extruded items, and since it is excellent in moldability, the productivity of the worked items can be increased. Further, since the fire-retardant resin composition of the first invention does not contain any halogen-type fire retardants, if the fire-retardant resin composition is burned, toxic gases are hardly produced. Thus, when the fire-retardant resin composition of the first invention is used, extruded items, such as a tube and a pipe, that have good appearance can be produced well on a commercial basis by using the conventional apparatus. The fire-retardant resin composition of the first invention can be extruded even on a metal wire and a metal pipe at a high speed.

The covered electric wire of the second invention has the circumference of a conductor covered with a resin composition prepared by blending a metal hydrate with a resin mixture containing, as essential resin components, a polypropylene-series resin, a polyethylene modified with an unsaturated carboxylic acid or its derivative, and an ethylene-series copolymer, such as an ethylene/vinyl acetate copolymer. Therefore the covered electric wire of the second invention has excellent fire retardancy, mechanical properties, heat resistance, and abrasion resistance, which qualities are required for electric wires for automobiles and for internal wiring of electronic equipment, and the end workability in the covered electric wire is good. When the said resin composition is blended with an aromatic vinyl/diene block copolymer, the mechanical properties are improved further.

Since said resin composition that is used in the covering of the covered electric wire of the second invention is excellent in extrudability at high speed, the productivity in the production of a covered wire is high and the covered electric wire has a merit in view of cost, which is quite valuable industrially.

Now the present invention will be described specifically with reference to Examples and Comparative Examples, but the invention is not limited to these examples.

EXAMPLES 1 to 9 AND COMPARATIVE EXAMPLES 1 to 9

The formulations of resin compositions of Examples and Comparative Examples are shown in Table 1.

The components of the compositions of the Examples and the Comparative Examples were dry-blended in the formulation ratios shown in Table 1 at room temperature; then they were melted and kneaded by a Banbury mixer at a temperature of 180° C. for 15 min, and were pelletized by a pelletizer. The pellets of the compositions were tested as follows. The results are shown in Table 2.

Tensile Test

The obtained pellets of each of the compositions were extruded using PLASTI-CORDER extruder (19 mmϕ/L/D25), manufactured by BRABENDER Co., into a rod of about 2 mmϕ diameter, which was used as a tensile test sample. The set temperature of the extruder was 200° C., and the extrusion speed was 5 m/min.

The tensile test was carried out in such a way that the rodlike sample was cut to a length of 150 mm, and the length was tested by a universal tensile tester, manufactured by INTESCO Co., under such conditions that the stress rate was 200 mm/min, the distance between the chucks was 50 mm, and the gauge length was 20 mm to measure tensile strength and elongation.

Low-Temperature Brittle Test

The obtained pellets of the compositions were made into a sheet of 2 mm thickness by a hot press at 180° C., and the evaluation was made in accordance with JIS K 7216.

Heat Deformation Test

Similarly to the low-temperature brittle test, a sheet of 2 mm thickness was formed, and the evaluation was made in accordance with JIS K 7620. The test temperature was 120° C., and the load was 1 kgf.

Fire Retardancy Test

A sheet of 3 mm thickness was formed by a hot press, and the evaluation was made in accordance with UL-94HB. (UL

TABLE 1

| | Example | | | | | | | | | Comparative example | | | | | | | | |
|---|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 | 9 |
| R-PP1 | 35 | 35 | 30 | 25 | — | 40 | 30 | 30 | 27 | 50 | 40 | 20 | 20 | — | — | — | — | 60 |
| R-PP2 | — | — | — | — | 35 | — | — | — | — | — | — | — | — | — | — | — | — | — |
| B-PP | — | — | — | — | — | — | — | — | 3 | — | — | — | — | — | 40 | — | — | — |
| Homo-PP | — | — | — | — | — | — | — | — | — | — | — | — | — | — | — | 40 | — | — |
| EPR | — | — | — | — | — | — | — | — | — | — | — | — | — | — | — | — | 40 | — |
| MAH-PE | 5 | 5 | 5 | 5 | 5 | 5 | 5 | 5 | 5 | — | — | 30 | — | 10 | 10 | 10 | 10 | 10 |
| MAH-PP | — | — | — | — | — | — | — | — | — | — | 10 | — | — | — | — | — | — | — |
| EVA 1 | 10 | — | 10 | 20 | 10 | 10 | 10 | — | — | — | — | — | — | — | — | — | — | — |
| EVA 2 | — | — | — | — | — | — | — | 10 | 10 | — | — | — | 30 | — | — | — | — | — |
| EEA | — | 10 | — | — | — | — | — | — | — | — | — | — | — | 40 | — | — | — | — |
| SEBS | — | — | 5 | — | — | — | — | 5 | 5 | — | — | — | — | — | — | — | — | — |
| Magnesium hydroxide | 50 | 50 | 50 | 50 | 50 | 45 | 55 | 50 | 50 | 50 | 50 | 50 | 50 | 50 | 50 | 50 | 50 | 30 |
| Antioxidant | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |

The above formulations are expressed in wt % except that those of antioxidant is in parts by weight.

| R-PP1 | ethylene/propylene random copolymer | MFR = 3 | ethylene contents | 4.5% |
|---|---|---|---|---|
| R-PP2 | " | MFR = 4 | " | 3.0% |
| B-PP | ethylene propylene block copolymer | MFR = 3 | " | 7.0% |
| Homo-PP | homo-polypropylene | MFR = 3 | | |
| EPR | ethylene propylene rubber | MFR = 3 | | |
| MAH-PE | polyethylene modified with maleic anhyride | MFR = 1.5 | amounts of maleic anhydride | 0.2% |
| MAH-PP | polypropylene modified with maleic annyride | MFR = 3 | " | 0.3% |
| EVA 1 | ethylene/vinyl acetate copolymer | MFR = 0.5 | amounts of comonomer | 28% |
| EVA 2 | " | MFR = 2 | " | 20% |
| EEA | ethylene/ethyl acrylate copolymer | MFR = 1.5 | " | 15% |

SEBS: styrene/hydrogenated-butadien/styrene copolymer, Kraton G1652 manufactured by Shell Chemistry Co.
Magnesium hydroxide: high-purity magnesium hydroxide, manufactured by Kyowa Kagaku K.K.
Antioxidant: Irganox 1010, manufactured by Ciba Geigy AG.

means UNDERWRITERS LABORATORIES STANDARD.) When the flame died out between the gauges of the sample, it was judged as being self-extinguishable (marked with o), and when the flame reached the clamp, it was marked with x.

TABLE 2

| Physical properties test | Example | | | | | | | | |
|---|---|---|---|---|---|---|---|---|---|
| | 1 | 2 | 3 | 4 | 5 | 6 | 7 | 8 | 9 |
| Tensile Test | | | | | | | | | |
| strength (MPa) | 22.5 | 21.9 | 24.3 | 20.7 | 23.1 | 27.1 | 19.8 | 22.2 | 23.1 |
| elongation (%) | 610 | 680 | 540 | 600 | 630 | 700 | 570 | 630 | 600 |
| Low-temperature Brittle Test F50(°C.) | −26 | −30 | −35 | −28 | −30 | −31 | −27 | −30 | −29 |
| Heat Deformation Test rate of deformation (%) | 3.6 | 3.8 | 4.0 | 5.8 | 3.1 | 2.9 | 2.8 | 2.4 | 2.5 |
| Fire Retardancy Test UL-94HB | o | o | o | o | o | o | o | o | o |

| Physical properties test | Comparative example | | | | | | | | | |
|---|---|---|---|---|---|---|---|---|---|---|
| | 1 | 2 | 3 | 4 | 5 | 6 | 7 | 8 | 9 | PVC |
| Tensile Test | | | | | | | | | | |
| strength (MPa) | 20.1 | 16.8 | | 17.2 | 11.5 | 15.9 | 15.7 | 10.5 | 31.8 | 27.4 |
| elongation (%) | 700 | 70 | | 620 | 680 | 60 | 30 | 700 | 710 | 330 |
| Low-temperature Brittle Test F50 (°C.) | −7 | −12 | −20 | −21 | −35 | −23 | −3 | −30 | −32 | — |
| Heat Deformation Test rate of deformation (%) | 1.5 | 1.0 | 3.7 | 35.8 | 40< | 1.1 | 0.9 | 40< | 2.3 | 8.5 |
| Fire Retardancy Test UL-94HB | o | o | o | o | o | o | o | o | x | o |

Note:
o indicates self-extinguishable
x indicates that the flame reached the clamp.

As is shown in the results in Table 2, the fire-retardant resin compositions of the first invention shown in the Examples show excellent mechanical strength, extension, and heat resistance, and the compositions are satisfactory in cold resistance and fire resistance.

Further, to evaluate the moldability for Examples 1, 4, and 8 at a high speed, a soft copper wire of 0.8 mm diameter was covered with each of the compositions at an extrusion temperature of 200° C., so that the copper wire would have a covering layer of 0.3 mm thickness.

TABLE 3

| Physical properties test | Example | | |
|---|---|---|---|
| | 1 | 4 | 8 |
| Possible molding-speed (m/min) | 500< | 500< | 500< |
| Tensile strength of molded wire (MPa) | 23 | 21 | 24 |
| Tensile elongation of molded wire (%) | 640 | 580 | 560 |
| Fire retardancy Test* | Pass | Pass | Pass |

Note:
*The Test was carried out according to JIS C 3005.

As is shown in Table 3, despite that the fire-retardant resin composition of the first invention is a non-halogen-type fire-retardant composition containing a large amount of magnesium hydroxide, it can be understood that the fire-retardant resin composition of the first invention is an excellent composition that can be molded at a very high speed of 500 m/min.

EXAMPLES 10 TO 22 AND COMPARATIVE EXAMPLES 10 TO 17

The components shown in Table 4 were dry-blended in the formulation ratios as shown at room temperature, and they were melted and kneaded using a Banbury mixer under conditions of a kneading temperature of 180° C. and a kneading time of 15 min, to obtain resin compositions corresponding to the Examples and the Comparative Examples. Then, using a usual electric-wire covering apparatus, each of the obtained compositions was extruded to cover a soft copper wire having a conductor diameter of 0.9 mm with a layer of the composition of 0.35 mm thickness, thereby producing a covered electric layer.

For each of the covered electric wires, the tensile strength (MPa) and the elongation (%) of the covering layer were measured by the tensile test. The test was carried out with the gauge length being 25 mm and the stress rate being 50 m/min.

The fire retardancy of the electric wire was evaluated in accordance with JIS C 3005. The flame application time was 15 sec, and the period between the point where the flame was removed gently and the point where the flame died out spontaneously (horizontal burning time) was measured.

For the evaluation of the heat resistance of the covering layer, the heat deformation of the covered electric wire was evaluated in accordance with JIS C 3005. The test temperature was 120° C., the load was 306 gf, and when the deformation of the covering layer was 30% or less, it was judged that the covering layer was acceptable.

For the abrasion resistance of the electric wire, the minimum abrasion resistance was measured in accordance with the abrasion tape method of the JASO standard. (JASO means JAPANESE AUTOMOBILE STANDARD ORGANIZATION.) Abrasion resistance was measured at the condition of "nominal size" being 0.3 to 0.5 (mass of a weight, 450 g, Table 4 in the annex paper of the JASO standard). When the minimum abrasion resistance was 457 mm or over, it was judged that the abrasion resistance was acceptable (marked with o).

The evaluation of the end workability of the electric wire was made by using a casting machine, and when the length of the covering material residue made by using the casting machine was 0.3 mm or less, it was evaluated as being o; when the length of the covering material residue was 0.3 to 0.6 mm, it was evaluated as being Δ; and when the length of the covering material residue was 0.6 mm or more, it was evaluated as being X. The criterion of this evaluation was based on the fact that when the length of the covering material residue was 0.3 mm or less, working at the end of the covered electric wire caused no problem, while when the covering material residue was longer than that, the step of connecting a terminal resulted in the problem that a contact failure took place.

The extrudability of the resin compositions was evaluated by covering an annealed copper wire of 0.9 mm diameter with the resin composition at an extrusion temperature of 200° C. using an extruder of 50 mm diameter. When the extrusion speed was 400 m/min or higher, it was evaluated as being o; when the extrusion speed was 100 to 400 m/min, it was evaluated as being Δ; and when the extrusion speed was 100 m/min or lower, it was evaluated as being x.

The test samples for the evaluation of the fire retardancy, the heat resistance, the abrasion resistance, and the end workability of the covered wires were prepared basically by molding at 400 m/min. Those materials that could be prepared by molding only at extrusion speeds lower than that were made into test samples at the highest extrusion speed for the materials.

The results of the evaluation are summarized in Table 4.

TABLE 4

| | Example | | | | | | | | | | | | |
|---|---|---|---|---|---|---|---|---|---|---|---|---|---|
| | 10 | 11 | 12 | 13 | 14 | 15 | 16 | 17 | 18 | 19 | 20 | 21 | 22 |
| Resin composition Formulations in weight ratio | | | | | | | | | | | | | |
| R-PP1 | — | — | — | 70 | 70 | 60 | 50 | — | 73 | 67 | 60 | 54 | 45 |
| R-PP2 | 70 | 55 | 60 | — | — | — | — | 70 | — | — | — | 6 | — |
| B-PP | — | — | — | — | — | — | — | — | — | — | — | — | — |
| Homo-PP | — | — | — | — | — | — | — | — | — | — | — | — | — |
| MAH-PE | 10 | 10 | 10 | 10 | 10 | 10 | 10 | 10 | 9 | 11 | 10 | 10 | 10 |
| MAH-PP | — | — | — | — | — | — | — | — | — | — | — | — | — |
| EVA 1 | — | — | — | 20 | — | 20 | 40 | 20 | 18 | 22 | — | — | — |
| EVA 2 | 20 | 35 | 20 | — | — | — | — | — | — | — | 20 | 20 | 45 |
| EEA | — | — | — | — | 20 | — | — | — | — | — | — | — | — |
| SEBS | — | — | 10 | — | — | 10 | — | — | — | — | 10 | 10 | — |
| Magnesium hydroxide | 90 | 90 | 90 | 100 | 100 | 100 | 100 | 100 | 82 | 122 | 100 | 100 | 100 |
| Antioxidant | 0.3 | 0.3 | 0.3 | 0.3 | 0.3 | 0.3 | 0.3 | 0.3 | 0.3 | 0.3 | 0.3 | 0.3 | 0.3 |
| Extrudability | o | o | o | o | o | o | o | o | o | o | o | o | o |
| Characteristics of electric wire | | | | | | | | | | | | | |
| Tensile strength (MPa) | 23.5 | 21.6 | 25.6 | 23.4 | 22.3 | 25.2 | 21.2 | 24.4 | 26.6 | 20.6 | 23.8 | 24.8 | 20.4 |
| Elongation (%) | 580 | 550 | 650 | 640 | 600 | 560 | 580 | 560 | 680 | 520 | 560 | 560 | 600 |
| Horizontal burning time (sec) | 6~10 | 6~9 | 6~10 | 6~10 | 7~11 | 7~11 | 7~11 | 6~10 | 9~12 | 6~8 | 6~8 | 6~10 | 6~10 |
| Heat deformation (%) | 16.8 | 26.4 | 14.2 | 16.8 | 15.1 | 17.5 | 18.2 | 14.6 | 12.8 | 13.5 | 11.4 | 10.6 | 19.7 |
| Abrasion resistance (mm) | 900 | 750 | 900 | 900 | 900 | 900 | 750 | 900 | 1050 | 750 | 1050 | 1050 | 750 |
| workability at the end of wire | o | o | o | o | o | o | o | o | o | o | o | o | o |

| | Comparative example | | | | | | | |
|---|---|---|---|---|---|---|---|---|
| | 10 | 11 | 12 | 13 | 14 | 15 | 16 | 17 |
| Resin composition Formulations in weight ratio | | | | | | | | |
| R-PP1 | — | — | — | — | — | — | — | 40 |
| R-PP2 | 90 | 100 | — | 35 | 65 | 85 | 90 | — |
| B-PP | — | — | — | — | — | — | — | — |
| Homo-PP | — | — | — | — | — | — | — | — |
| MAH-PE | — | — | 10 | 10 | 35 | 15 | 10 | 10 |
| MAH-PP | 10 | — | — | — | — | — | — | — |
| EVA 1 | — | — | — | — | — | — | — | 20 |
| EVA 2 | — | — | 90 | 55 | — | — | — | — |
| EEA | — | — | — | — | — | — | — | — |
| SEBS | — | — | — | — | — | — | — | 30 |
| Magnesium hydroxide | 90 | 100 | 90 | 90 | 90 | 200 | 40 | 100 |

TABLE 4-continued

| | | | | | | | | |
|---|---|---|---|---|---|---|---|---|
| Antioxidant | 0.3 | 0.3 | 0.3 | 0.3 | 0.3 | 0.3 | 0.3 | 0.3 |
| Extrudability Characteristics of electric wire | Δ | Δ | Δ | Δ | x | Δ | Δ | x |
| Tensile strength (MPa) | 30.4 | 23.0 | 12.7 | 14.7 | — | 13.2 | 33.3 | — |
| Elongation (%) | 60 | 80 | 500 | 520 | — | 60 | 680 | — |
| Horizontal burning time (sec) | 10~14 | 9~12 | 6~8 | 6~9 | — | 6~8 | 28~40 | — |
| Heat deformation (%) | 8.9 | 11.5 | 30< | 30< | — | 28.7 | 7.0 | — |
| Abrasion resistance (mm) | 900 | 300 | 300 | 300 | — | 150 | 900 | — |
| workability at the end of wire | Δ | Δ | Δ | x | — | x | Δ | — |

As is shown in the results in Table 4, each of samples of covered electric wire in Examples 10 to 22, which were prepared according to the second invention of the present invention, has excellent electric wire characteristics, including mechanical strength, elongation, fire retardancy, thermal resistance, and abrasion resistance, and each is excellent in workability at the end of electric wire and in the extrudability of the covering composition.

On the contrary, samples of Comparative Examples 10 to 17 are inferior to the samples of the second invention in workability at the end of electric wire and in extrudability of the covering composition, and they are not good in one or more properties, with respect to the above electric wire characteristics, such that they are unsatisfactory as a covered electric wire.

Having described our invention as related to the present embodiments, it is our intention that the invention not be limited by any of the details of the description, unless otherwise specified, but rather be construed broadly within its spirit and scope as set out in the accompanying claims.

What we claim is:

1. An electric wire with a cover layer formed on the circumference of a conductor, in which the cover layer is composed of a composition prepared by blending 100 parts by weight of a resin mixture with 50 to 180 parts by weight of (c) a metal hydrate; said resin mixture contains, as resin components, (a) a polypropylene-series resin containing 50% by weight or more of an ethylene/propylene random copolymer in an amount of 40% by weight or more but less than 88.5% by weight, (b) a modified polyethylene in an amount of 1.5 to 30% by weight, which polyethylene is modified with an unsaturated carboxylic acid or its derivative and (d) an ethylene-series copolymer in an amount of 10% by weight or more, but less than 48% by weight, said ethylene-series copolymer is an ethylene/vinyl acetate copolymer or an ethylene/ethyl acrylate copolymer or a mixture thereof, wherein said derivative is selected from the group consisting of a maleic acid monoester, a maleic acid diester, maleic anhydride, an itaconic acid monoester, an itaconic acid diester, itaconic anhydride, a fumaric acid monoester, and a fumaric acid diester.

2. The covered electric wire as claimed in claim 1, wherein the content of ethylene component of said ethylene/propylene random copolymer in said polypropylene-series resin (a) is 0.5 to 6.0% by weight.

3. The covered electric wire as claimed in claim 1, wherein said modified polyethylene (b) is a polyethylene modified with maleic anhydride.

4. The covered electric wire as claimed in claim 1, wherein said resin mixture contains further (e), an aromatic vinyl/diene block copolymer, in an amount of 20% by weight or less.

5. The covered electric wire as claimed in claim 1, wherein said metal hydrate (c) is a magnesium hydroxide.

6. The covered electric wire as claimed in claim 1, wherein said composition further comprises an antioxidant, a copper-damage-prevention agent, an ultraviolet absorber, a dispersant, or a pigment.

7. The covered electric wire as claimed in claim 4, wherein said aromatic vinyl/diene block copolymer (e) is a styrene/hydrogenated butadiene/styrene copolymer.

* * * * *